United States Patent [19]

Suzuki et al.

[11] Patent Number: 5,588,260
[45] Date of Patent: Dec. 31, 1996

[54] CONSTRUCTION OF A VEHICLE DOOR PROVIDED WITH A WIRING HARNESS AND A WATERPROOF GROMMET USED IN THE CONSTRUCTION

[75] Inventors: Shigemichi Suzuki; Sadahisa Endo, both of Omiya, Japan

[73] Assignee: Kansei Corporation, Omiya, Japan

[21] Appl. No.: 452,525

[22] Filed: May 30, 1995

[30] Foreign Application Priority Data

| May 30, 1994 | [JP] | Japan | 6-116352 |
| Oct. 31, 1994 | [JP] | Japan | 6-266464 |
| Mar. 17, 1995 | [JP] | Japan | 7-59313 |

[51] Int. Cl.⁶ ........................... B60J 5/04
[52] U.S. Cl. .................. 49/502; 49/167; 296/146.5; 296/208
[58] Field of Search ............... 49/502, 167; 296/208, 296/146.5

[56] References Cited

U.S. PATENT DOCUMENTS

| 3,053,564 | 9/1962 | Evans et al. | 49/167 |
| 3,151,905 | 10/1964 | Reuther et al. | 49/167 |
| 4,869,670 | 9/1989 | Ueda et al. | 49/502 X |
| 5,092,647 | 3/1992 | Ueda et al. | 49/167 X |
| 5,405,672 | 4/1995 | Takiguchi et al. | 296/146.5 X |

FOREIGN PATENT DOCUMENTS

| 58-20405 | 4/1983 | Japan . |
| 2-10737 | 3/1990 | Japan . |
| 2-46438 | 12/1990 | Japan . |
| 5-300629 | 4/1993 | Japan . |
| 6-18097 | 3/1994 | Japan . |

*Primary Examiner*—Philip C. Kannan
*Attorney, Agent, or Firm*—Jacobson, Price, Holman & Stern, PLLC

[57] ABSTRACT

A waterproof grommet (16) through which a wiring harness (14) passes is mounted on a side face (15) of an inner door panel (13) to which a door hinge is attached. The waterproof grommet (16) is made of an elastic substance and has a grommet body (17). The grommet body (17) through which the harness (14) passes is brought into contact with the side face (15). The grommet body (17) includes a mounting plate (18) for pressing and fastening the grommet body (17) to the side face (15). Because the elastic grommet body (17) is pressed and fastened to the side face (15) of the inner door panel (13) by the rigid mounting plate (18), the gap around the door can be sealed without additionally using a sealing member and, as a result, the number of constituent parts and the number of processes of arranging then can be reduced.

23 Claims, 14 Drawing Sheets

CONSTRUCTION OF A VEHICLE DOOR PROVIDED WITH A WIRING HARNESS AND A WATERPROOF GROMMET USED IN THE CONSTRUCTION

BACKGROUND OF THE INVENTION

1. Field of the Invention

This invention relates to a construction of a vehicle door provided with a wiring harness and a waterproof grommet used in the construction.

2. Description of the Prior Art

A conventional structure of a vehicle door provided with a door harness (wiring harness) is known as shown in FIGS. 21 and 22 which are cited from Japanese Utility Model Application Early Laid-Open Publication No. Hei 8-18097.

In this door, a concave groove 3 is formed in a side face 2 (parallel to a direction of a vehicle width) on the door hinge side of a door panel 1. A mounting plate made of synthetic resin is fastened to the concave groove 3 by means of screws 5 so that the mounting plate 4 becomes flush with the side face 2 around the concave groove 3. A harness 6 passes through the mounting plate 4 and stretches from the door to a part of a vehicle body enclosing the door. The mounting plate 4 is provided with a frontal waterproof sheet 7 and lateral waterproof sheets 8. A weather strip 9 and fillers 10 are mounted on the frontal waterproof sheets 7.

The frontal and lateral waterproof sheets 7, 8 and fillers 10 are used to close small openings left between the mounting plate 4 and the side face 2.

For example, if the concave groove 3 and the mounting plate 4 are molded inaccurately, it is difficult to make the mounting plate 4 completely flush with the side face 2 when the mounting plate 4 is fitted in the concave groove 3. Therefore, as shown in FIG. 22, in order to ensure the sealing between the door panel 1 and the mounting plate 4, the fillers 10 and frontal and lateral waterproof sheets 7, 8 are used. However, disadvantageously, this results in the increase of the number of component parts and the increase of the number of processes of arranging them.

This type of door construction provided with a harness is disclosed in, for example, Japanese Utility Model Application Nos. Sho 58-20405, Hei 2-10737, and Hei 2-46438, Japanese Patent Application Early Laid-Open Publication No. Hei 5-3006, and Japanese Utility Model Application Early Laid-Open Publication No. Hei 6-18097.

SUMMARY OF THE INVENTION

It is an object of the present invention to provide a construction of a vehicle door provided with a door harness, in which the number of component parts and the number of processes of arranging them can be reduced.

It is another object of the present invention to provide a construction of a vehicle door provided with a door harness, in which a door panel can be easily manufactured without forming a concave groove in a side face of the door panel.

It is still another object of the present invention to provide a construction of a vehicle door provided with a door harness, in which the gap between a part of a vehicle body enclosing the door and a weather strip mounted on the door is sealed uniformly both in a place where the harness is laid and in the other place.

It is still another object of the present invention to provide a construction of a vehicle door provided with a door harness, in which a larger quantity of harness is contained within a concavity formed in the side face of the door panel than in the prior art.

It is still another object of the present invention to provide a construction of a vehicle door provided with a door harness, in which the harness is prevented from becoming untidy and overflowing the concavity when the harness is laid in the concavity.

In order to achieve the objects, the present invention is characterized in that, in a construction of a vehicle door provided with a wiring harness, comprising a door trim which an entry of a vehicle surface of a door panel of a door with which an entry of a vehicle is closed; and a wiring harness inserted between the door trim and the interior surface of the door panel, bent along a side face of the door panel to which a door hinge is attached, and extended to a part of a vehicle body enclosing the door from the side face, the construction further comprises a waterproof grommet through which the harness passes, mounted on the side face. The waterproof grommet is made of an elastic substance and has a grommet body and a fastening means for fastening the grommet body to the side face by pressing an edge of a mounting plate included in the grommet body against the side face so that the harness is watertightly laid between the grommet body and the side face by the fastening means.

Another feature of the present invention is that the mounting plate is inserted in the grommet body by an insertion-molding method.

Still another feature of the present invention is that the mounting plate is fitted in a space formed in the grommet body.

Still another feature of the present invention is that the mounting plate is larger in rigidity than the grommet body.

Still another feature of the present invention is that the fastening means consists of a piece formed on the mounting plate and a hole formed in the side face of the door panel. The piece is inserted and fastened in the hole.

Still another feature of the present invention is that the fastening means is a set of screws for fastening the grommet body to the side face.

Still another feature of the present invention is that the side face of the door panel to which the door hinge is attached is flattened.

Still another feature of the present invention is that a concavity is formed in a surface of a part of a vehicle body enclosing the door so as to receive a protrusion of a weather strip caused by lapping over the waterproof grommet when the door is closed.

Still another feature of the present invention is that a pair of projections are formed on a surface of a part of a vehicle body enclosing the door. The projections respectively face the upper and lower edges of the waterproof grommet with the weather strip between. The projections press the weather strip lapping over the grommet body against the side face when the door is closed.

Still another feature of the present invention is that the upper and lower edges of the grommet body each slope gently to the side face of the door panel.

Still another feature of the present invention is that, in a waterproof grommet through which a wiring harness passes, mounted on a side face of a door panel to which a door hinge is attached, and used in a construction of a vehicle door provided with the wiring harness in which a door trim is mounted on an interior surface of the door panel of a vehicle door with which an entry of a vehicle is closed and the wiring harness is inserted between the door trim and an interior surface of the door panel hinge is attached and then is of he door panel to which the door hinge is attached and then is extended toward a part of a vehicle body enclosing the door from the side face, the waterproof grommet is made of an elastic substance and has a grommet body including a mounting plate. The grommet body has a fastening means for pressing a peripheral part of the mounting plate against the side face of the door panel and fastening the grommet body to the side face so as to watertightly place the harness between the grommet body and the side face. The grommet body further has a cylindrical portion erected at an edge part of a surface of the grommet body and a covering portion integrated with the surface of the grommet body at the other edge part thereof. The covering portion is extended in a direction opposite to the cylindrical portion. The harness is laid in the form of a flattened array under the covering portion and is gradually made round and then is caused to pass through the cylindrical portion in the form of a cylindrical bundle.

Still another feature of the present invention is that the cylindrical portion of the grommet body has a constant diameter and a smooth surface.

Still another feature of the present invention is that, in a construction of a vehicle door provided with a wiring harness, comprising a door trim mounted on an interior surface of a door panel of a door with which an entry of a vehicle is closed; a wiring harness inserted between the door trim and the interior surface of the door panel, bent along a side face of the door panel to which a door hinge is attached, and extended to a part of a vehicle body enclosing the door from the side face, a concavity in which the harness is laid is formed in the side face to which the door hinge is attached, a waterproof grommet through which the harness passes is mounted on the side face so as to cover the concavity, and a weather strip laps over the waterproof grommet. The waterproof grommet is made of an elastic substance and has a grommet body including a mounting plate. The grommet body is sized so as to cover the concavity and is pressed against the side face surrounding the concavity. The grommet body has a fastening means for pressing a peripheral part of the mounting plate against the side face of the door panel and fastening the grommet body to the side face. The grommet body is shaped to be swollen when the grommet body is fastened to the side face and to be gently sloped from upper and lower edges of the grommet body over which the weather strip laps toward the side face.

Still another feature of the present invention is that a holding member is formed on a back side of the grommet body for holding the harness. The holding member is contained within the concavity when the door is closed.

Still another feature of the present invention is that a holding member is formed on the mounting plate for holding the harness. The holding member is contained within the concavity when the door is closed.

Still another feature of the present invention is that extension pieces are integrally formed on the upper and lower edges of a surface of the grommet body. The extension pieces are extended along the weather strip mounted thereon and are extended in a width of the weather strip. The extension pieces gradually become thinner in an extended direction of the extension pieces.

Still another feature of the present invention is that a pair of fences parallel to each other are integrally formed on the surface of the grommet body. The fences are erected along both sides of the weather strip.

DETAILED DESCRIPTION OF THE PREFERRED EMBODIMENT

Figure 1:
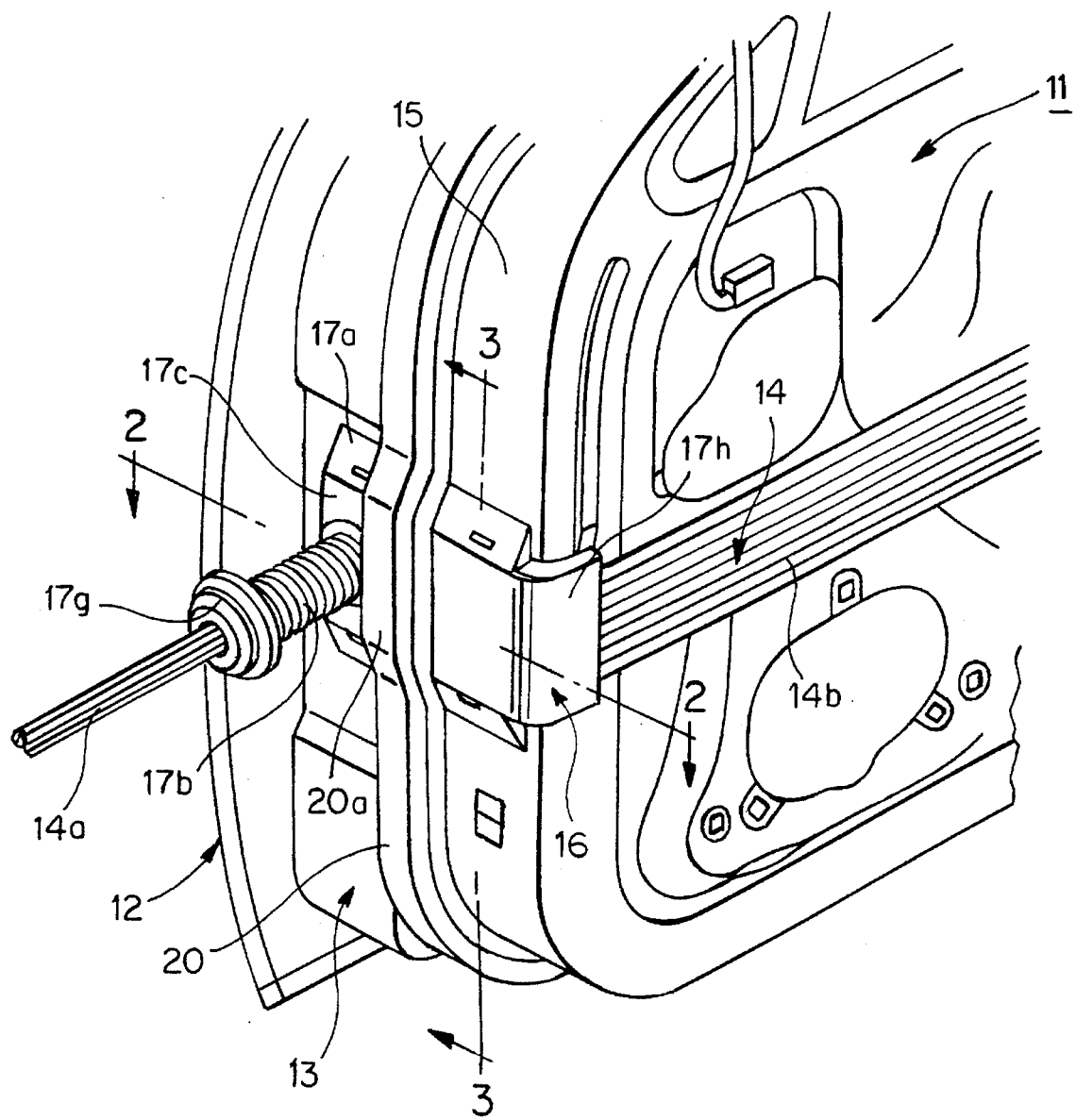
FIG. 1 is a perspective view of a door harness mounted on a vehicle door, showing a first embodiment of the present invention.
Figure 2:
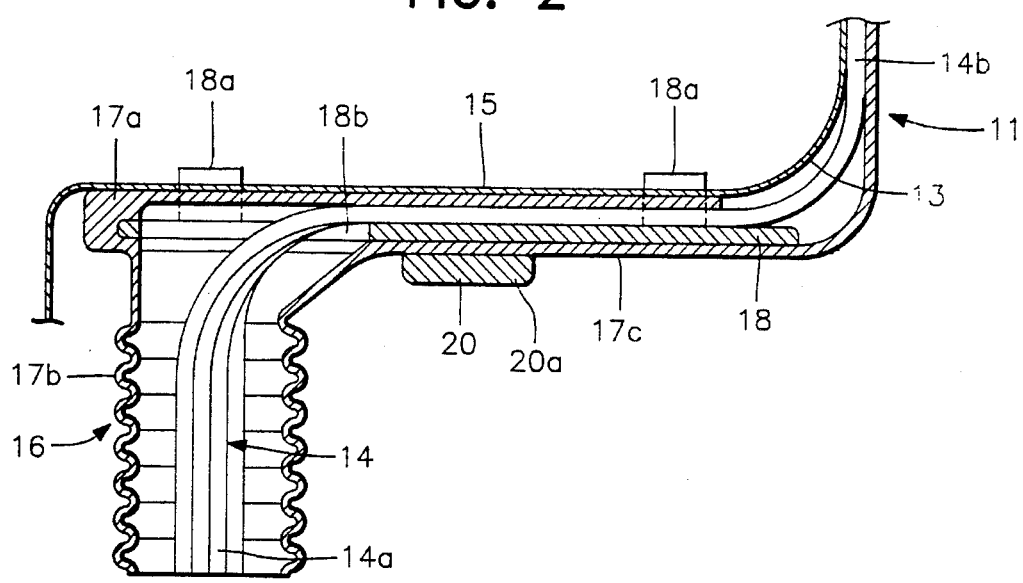
FIG. 2 is a sectional view taken on line A A of FIG. 1.

Embodiments of the present invention will now be described hereinafter with reference to the attached drawings.

FIGS. 1 to 8 show a first embodiment of the present invention.

First, a description of construction will be given. Reference character 11 designates a side door of a vehicle by which a door opening (entry) of the vehicle is closed and opened. The side door 11 is provided with an outer door panel 12 on the outside of the vehicle and an inner door panel 13 on the inside thereof. A door trim (not shown) is mounted on a surface of the inner door panel 13.

A wiring harness (door harness) 14 is laid between the door trim and the inner door panel 18 and is extended from the side of the door to the side of a vehicle body enclosing the door.

In more detail, a side face 15 of the inner door panel 13 to which a door hinge is attached is formed planar. A waterproof grommet 10 through which the harness 14 passes is mounted on the planar side face 15. A weather strip 20 is crosswise mounted on the waterproof grommet 16. The weather strip 20 serves to seal the gap between the door and the periphery of the door opening (not shown) when the door is closed.

The waterproof grommet 16 consists of a grommet body 17 and a mounting plate 18. The grommet body 17 is made of an elastic and flexible substance, such as rubber in this embodiment. The mounting plate 18 is an insert member which is inserted in the grommet body 17 by an insertion-molding method in which a molten substance of the elastic grommet body 17 is poured into a mold cavity in which the molded and hardened mounting plate 18 is beforehand placed, so that the grommet body 17 encloses the mounting plate 18. By the mounting plate 18, the grommet body 17 is pressed and fastened to the side face 15.

The grommet body 17 has a peripheral part 17a which is brought into contact with the side face 15 and a central part which lets the harness 14 pass through. Further, the grommet body 17 is provided with a cylindrical portion 17b projecting toward the front of the vehicle on the left-hand side of the grommet body 17 with respect to the weather strip 20. A cylindrically bundled harness 14a passes through the cylindrical portion 17b. A face 17c of the grommet body 17 is shaped like a trapezoid, so that a gentle slope runs up from the planar side face 15 to the surface 17c and, as a result, the sealing ability of the weather strip 20 is enhanced.

Figure 7:
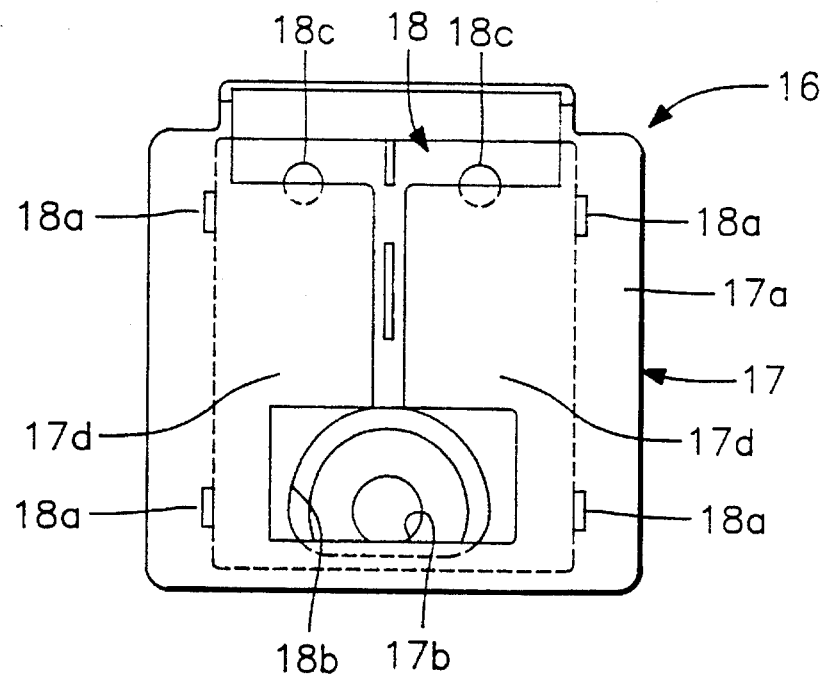
FIG. 7 is a rear elevation of the waterproof grommet of FIG. 5.

The mounting plate 18 is made of synthetic resin and, as shown in FIG. 7, is shaped like a rectangle. The mounting plate 18 is provided with four claw-like clips 18a formed on the edge of the plate 18 and an opening 18b through which the harness 14 passes. Further, the mounting plate 18 has a plurality of holes 18c for improving the combination of the mounting plate 18 with the grommet body 17 of which an elastic substance is supplied thereinto when molded. The clips 18a are formed to jut out of the rear surface of the grommet body 17 (see FIGS. 2 and 5).

Figure 4:
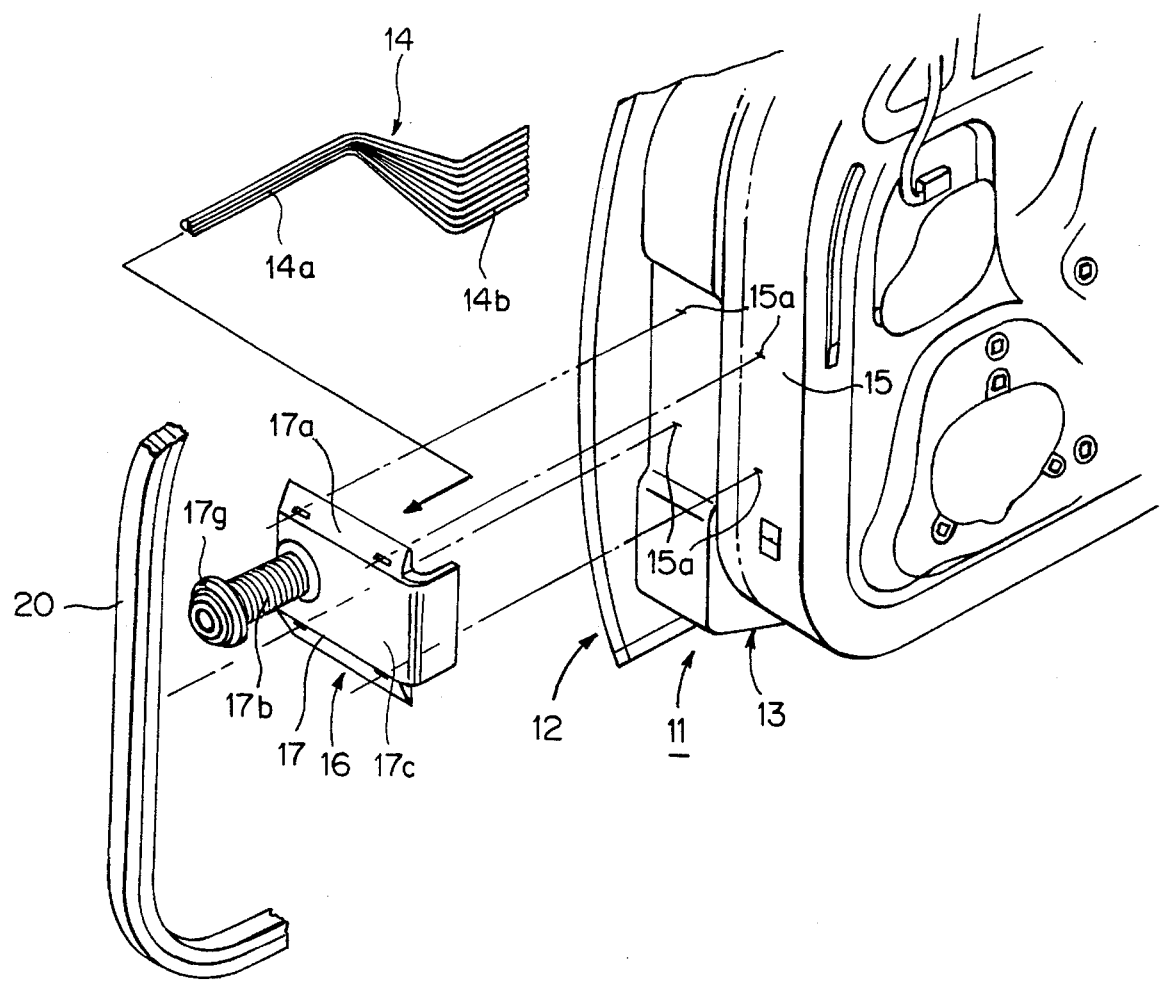
FIG. 4 is an exploded view of FIG. 1.

On the other hand, as shown in FIG. 4, four holes 15a in which the corresponding clips 18a are inserted and fastened are formed in the side face 15 of the inner door panel 13.

Figure 6:
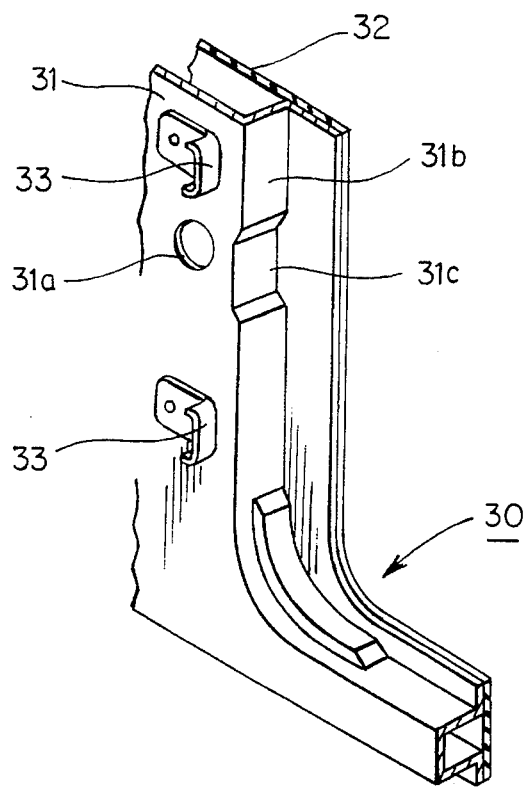
FIG. 6 is a perspective view of a center pillar, showing the first embodiment.
Figure 8:
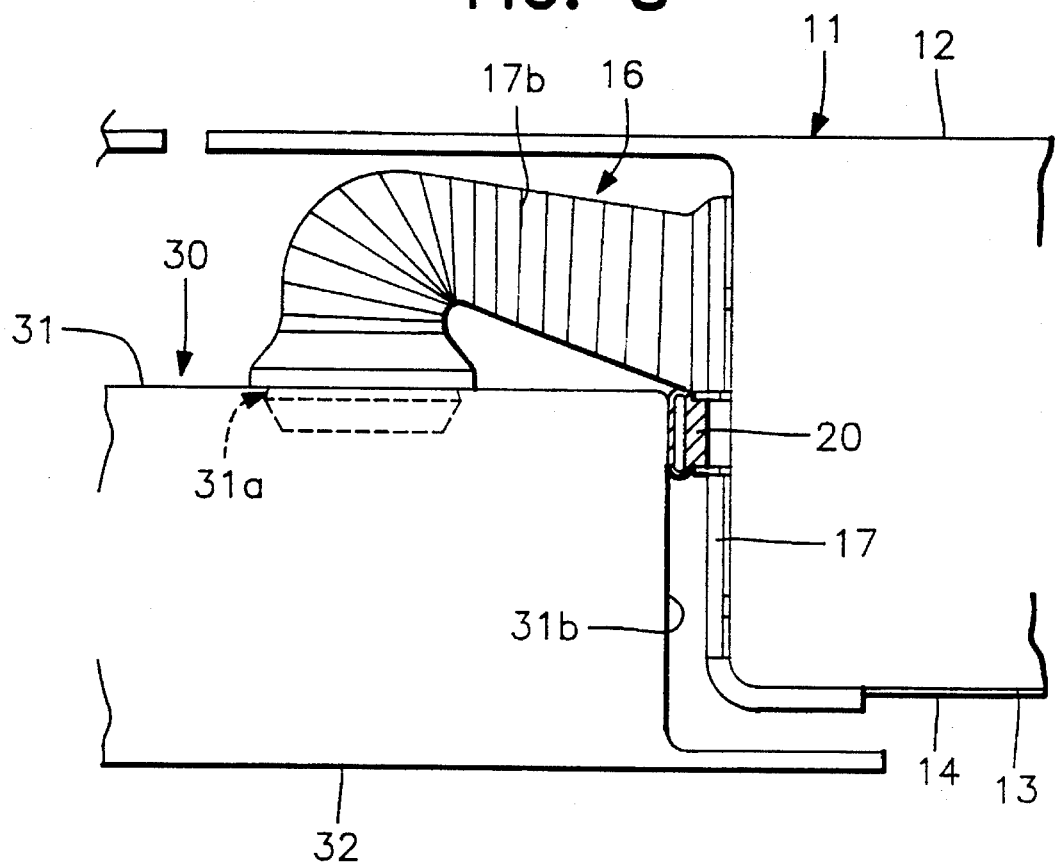
FIG. 8 is a schematic plan view showing a relationship between the center pillar and the waterproof grommet.

Referring to FIG. 6, reference character 30 designates a pillar of the vehicle body. The pillar 30 consists of a pillar outer 31 and a pillar inner 32. A pair of door hinge bases 33 are fastened to the pillar outer 31. A hole 31a into which the end of the cylindrical portion 17b of the waterproof grommet 16 is fitted as shown in FIG. 8 is formed between the door hinge bases 33. As shown in FIG. 1, an annular groove 17g which is engaged with the periphery of the hole 31a of the pillar 30 is formed in the outer surface of the end of the cylindrical portion 17b. Further, as shown in FIG. 1, the waterproof grommet 16 has a covering part 17h on the side opposite to the cylindrical portion 17b. The covering part 17h covers the harness 14 laid on the inner door panel 13. Referring again to FIG. 6, a concavity 31c is formed in a surface 31b of the pillar outer 31 perpendicular to the surface to which the door hinge bases 33 are fastened, in other words, is formed in a surface 31b of the pillar outer 31 flattened in the direction of the vehicle width and corresponding to the periphery of the door opening. When the door is closed, the concavity 31c receives a convexity 20a of the weather strip 20 which is formed by overlapping with the grommet body 17 mounted on the side face 15. By the way, the side door 11 shown in FIG. 1 is a left-hand door when looking at the vehicle from the front, but the pillar 30 shown in FIG. 6 is a right-hand pillar in order to have a better view of the concavity 31c, etc.

A description will now be given of a method of arranging the harness and other component parts in the door.

Figure 5:
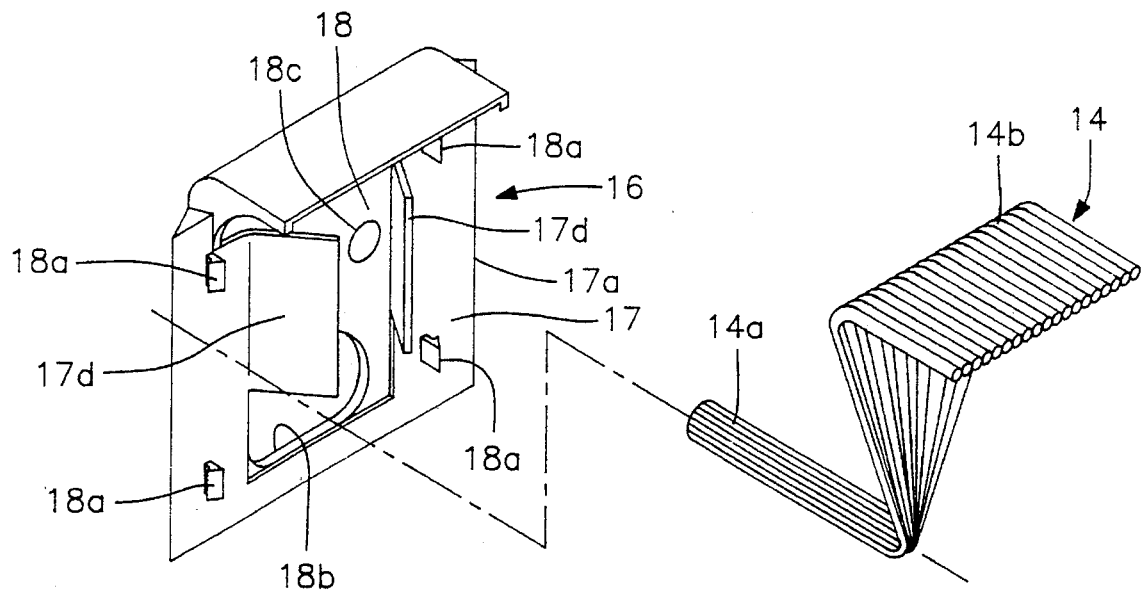
FIG. 5 is a perspective view of a waterproof grommet and the harness which is caused to pass through the waterproof grommet, showing the first embodiment.

As shown in FIG. 5, the cylindrically bundled part 14a of the harness 14 is inserted into the cylindrical portion 17b of the grommet body 17 in a state in which a lid 17d is opened like a double door, and a flatwise arrayed part 14b of the harness 14 is inserted into the back side of the lid 17d.

After that, the clips 18a are inserted and fastened in the holes 15a of the side 15 of the door inner panel 13. In this state, the elastic and flexible grommet body 17 is pressed on the side face 15 so as to ensure the sealing.

Next, the weather strip 20 is mounted on the waterproof grommet 16 and the side face 15.

Figure 22:
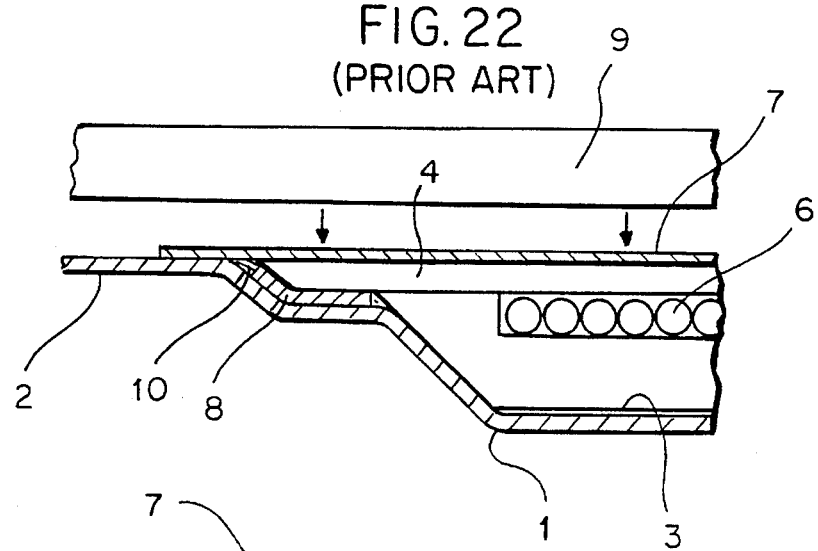
FIG. 22 is an enlarged sectional view of a sealed part of the vehicle door of FIG. 21.
Figure 22A:
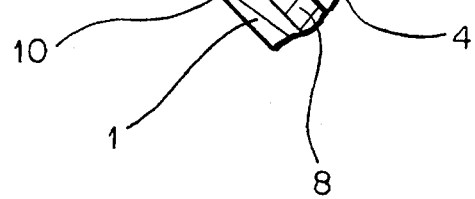
FIG. 22A is partial sectional view taken from FIG. 22.

According to this arrangement, the sealing can be ensured without using the conventional waterproof sheets 7, 8 shown in FIG. 22 because the elastic grommet body 17 is pressed on the side face 15. Accordingly, it is possible to reduce the number of component parts, such as the waterproof sheets 7, 8, and the number of processes of arranging them.

Figure 3:
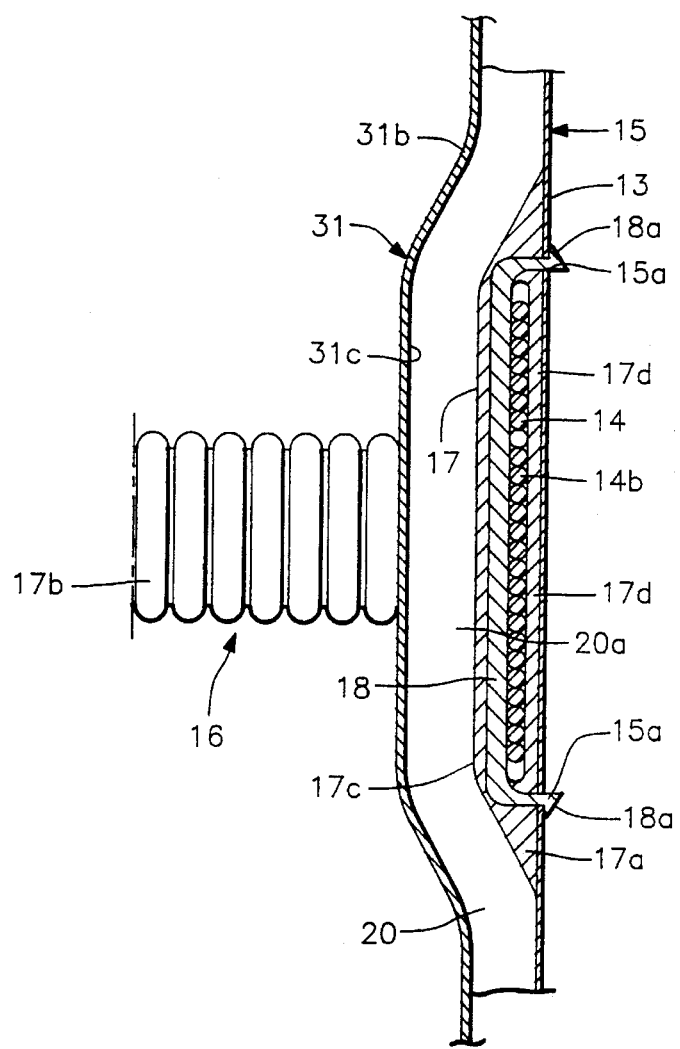
FIG. 3 is a sectional view taken on line B—B of FIG. 1.

Further, as shown in FIG. 3, when the door is closed, the grommet body 17 is indirectly received by the concavity 31c formed in the pillar outer 31 so as to be shaped to the grommet body 17. Accordingly, the weather strip 20 can uniformly perform the function of sealing because the weather strip 20 has the same amount of elastic deformation both in a part of the weather strip 20 facing the grommet body 17 and in the other part, eve if the sectional shape of the weather strip 20 is unchanged over the whole length of the weather strip 20.

In the first embodiment mentioned above, in order to fasten the waterproof grommet 18 to the side face 15 of the inner door panel 13, the clips 18a are inserted into the holes 15a formed in the side face 15. Instead, the grommet body 17 may be provided with four holes into which screws projecting from the side face 15 are inserted so that the edge part 17a of the grommet body 17 is pressed on the side face 15 by engaging the screws with nuts, not shown.

Figure 9:
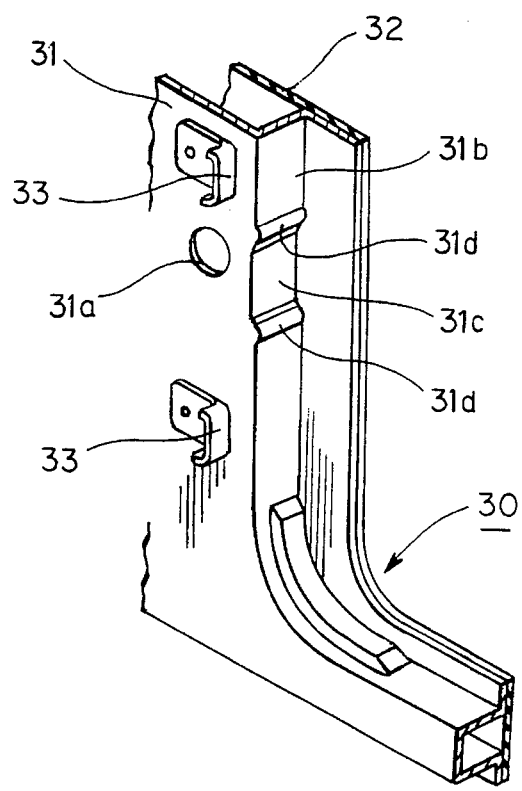
FIG. 9 is a perspective view of a center pillar, showing a second embodiment of the present invention.
Figure 10:
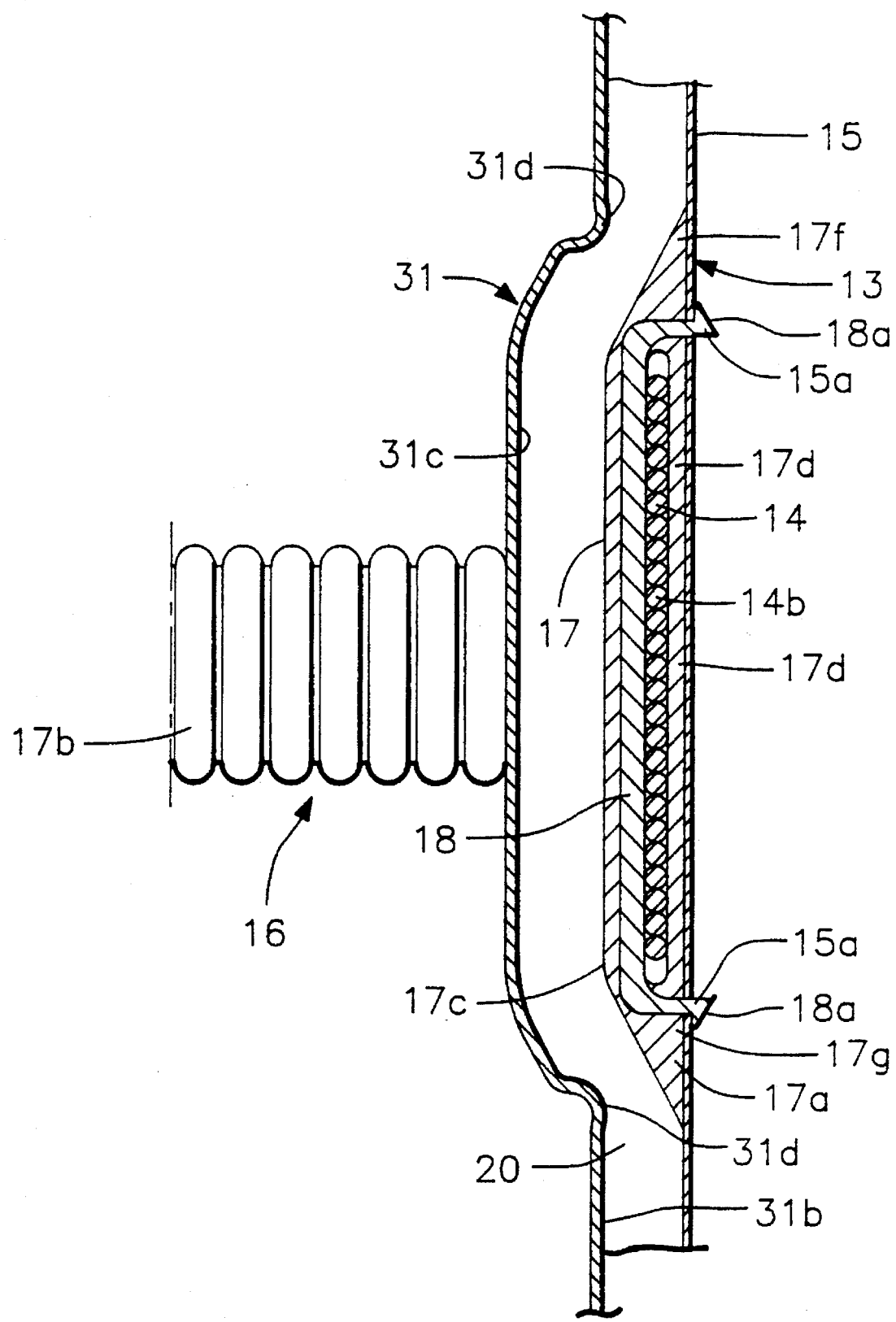
FIG. 10 is a sectional view which corresponds to FIG. 3, showing the second embodiment.

FIGS. 9 and 10 show a second embodiment of the present invention.

The second embodiment is different from the first embodiment is that a pair of convexities 31d are formed on the surface 31b of the pillar outer 31. The convexities 31d are formed at places respectively corresponding to the upper and lower edge parts 17f and 17g of the grommet body 17 fastened to the side face 15. As shown in FIG. 10, when the door is closed, the convexities 31d cut into the weather strip 20 mounted on the grommet body 17.

When the door is closed, the weather strip 20 on the door side is brought into contact with the surface 31b of the pillar outer 31 on the vehicle body side so as to seal the gap between the door and the vehicle body enclosing the door. At this time, as mentioned above, the convexities 31d cut into the parts of the weather strip 20 respectively corresponding to the upper and lower edge parts 17f and 17g of the grommet body 17. Accordingly, regardless of small openings between the weather strip 20, the grommet body 17, and the side face 15 of the inner door panel 18 caused when the door is opened, the convexities 31d press the weather strip 20 against the slanted upper and lower edge parts 17f and 17g so as to close the small openings when the door is closed. As a result, the sealing is certainly ensured.

Since the other construction and operation in the second embodiment is the same as in the first embodiment, a description of them is omitted.

FIGS. 11 to 14 show a third embodiment of the present invention.

Since most of the constituent parts used in the third embodiment are the same as those in the first embodiment, the same numerals are each given to the same constituent parts as in the first embodiment, and a description of them is omitted.

Figure 11:
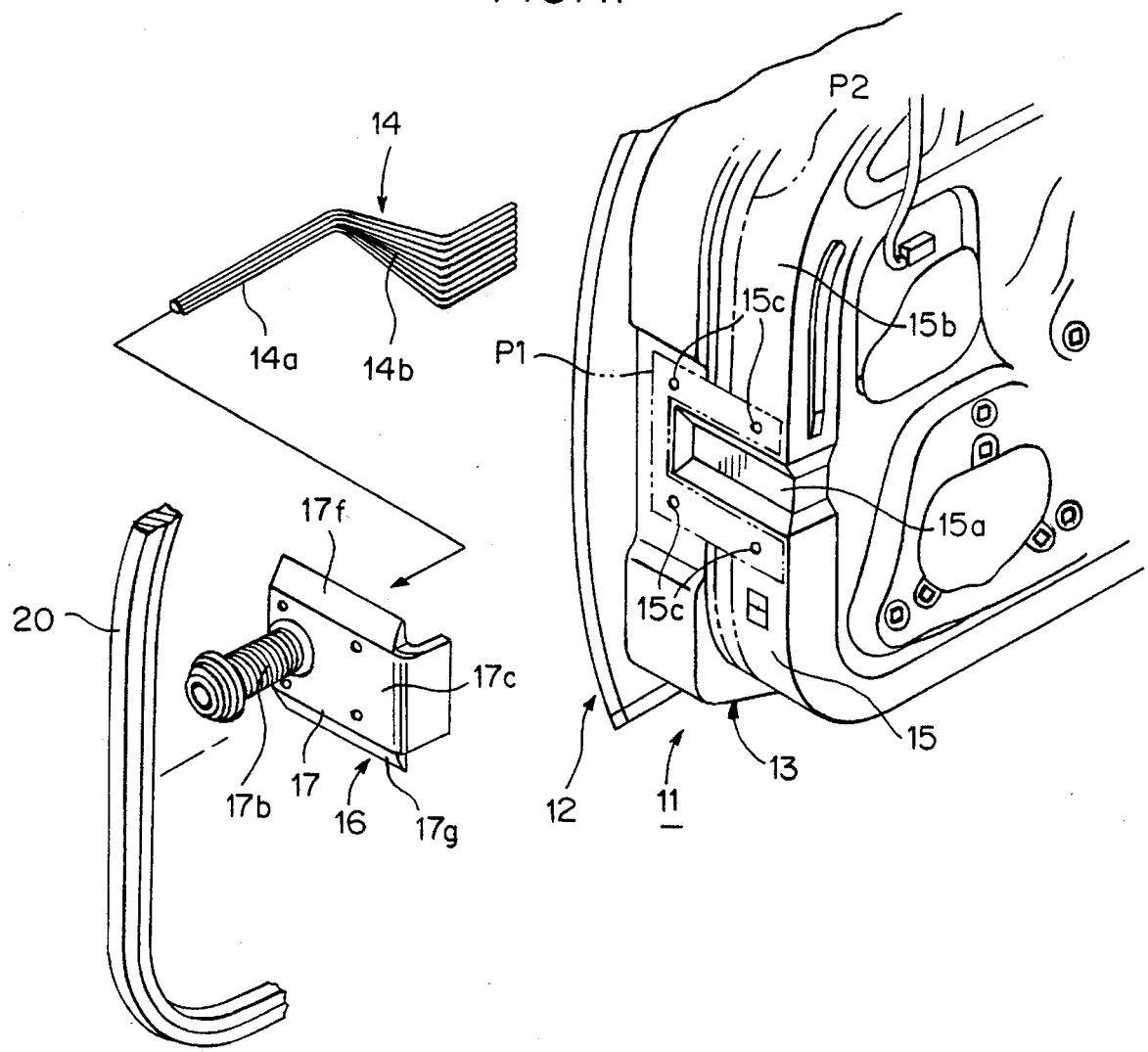
FIG. 11 is an exploded perspective view which corresponds to FIG. 4, showing the second embodiment.
Figure 12:
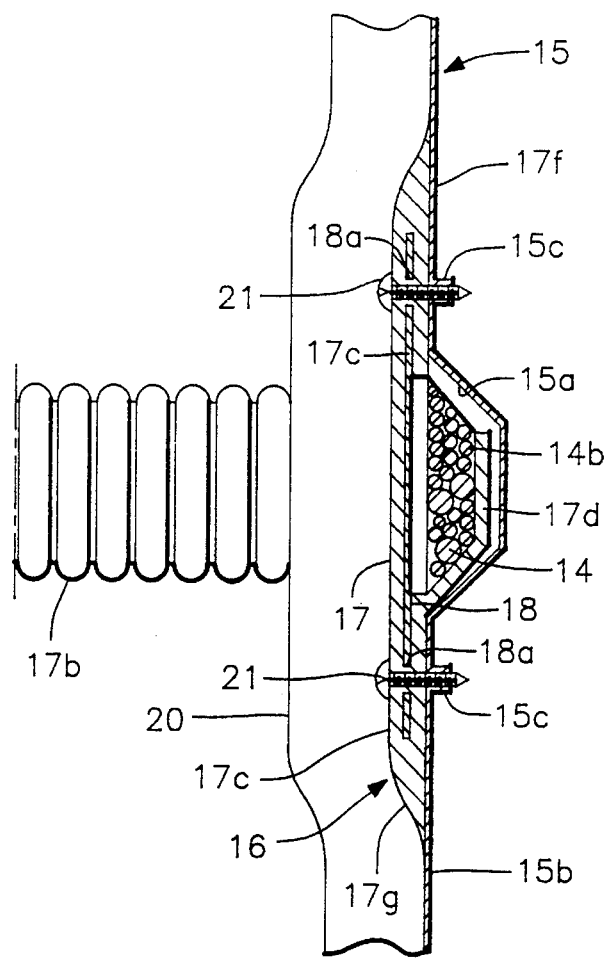
FIG. 12 is a sectional view taken on line B—B of FIG. 1, showing a third embodiment of the present invention.

As shown in FIGS. 11 and 12, a hollow 15a is formed in a side face 15 of an inner door panel 13, and a waterproof grommet 16 through which a door harness 14 passes is disposed to cover the hollow 15a. Further, a weather strip 20 is mounted on the waterproof grommet 16 and seals the gap between the door and the peripheral part of the door opening of the vehicle body, not shown, when the door is closed.

The waterproof grommet 16 consists of a grommet body 17 and a mounting plate 18. The grommet body 17 is made of an elastic and flexible substance, such as rubber in this embodiment. The mounting plate 18 is an insert member which is inserted in the grommet body 17 by the insertion-molding method, and the grommet body 17 is pressed and fastened to the side face 15 by the mounting plate 18.

Figure 13:
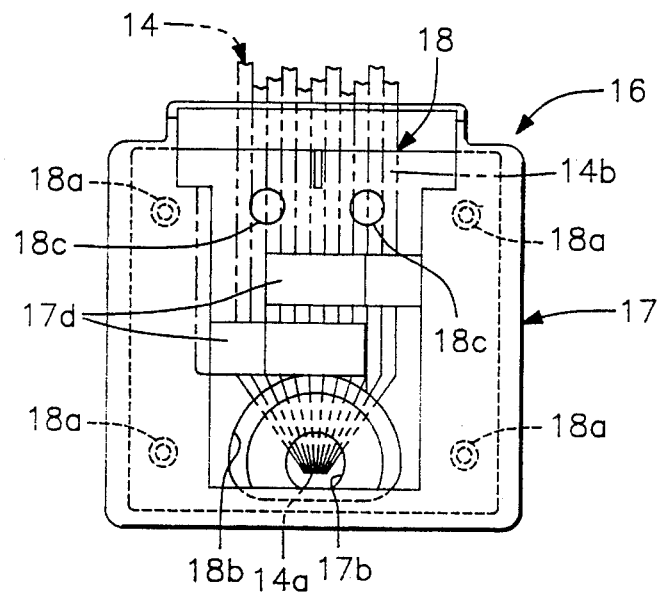
FIG. 13 is a rear elevation of the waterproof grommet, showing the third embodiment.

The grommet body 17 has a peripheral part 17a which is brought into contact with the side face 15 and a central part which lets the harness 14 pass through. Further, the grommet body 17 is provided with a cylindrical portion 17b projecting toward the front of the vehicle on the left-hand side of the grommet body 17 with respect to the weather strip 20. A cylindrically bundled harness 14a passes through the cylindrical portion 17b. The frontal part 17c of the grommet body 17 is shaped like a trapezoid, so that a gentle slope runs up from the planar side face 15 to the frontal part 17c and thereby the close contact of the weather strip 20 with the side face 15 is ensured. Further, as shown in FIGS. 12 and 13, a pair of holders 17d are integrally formed on the back surface of the grommet body 17d. The holders are each a holding member for holding the harness 14 within the hollow 15a.

Figure 14:
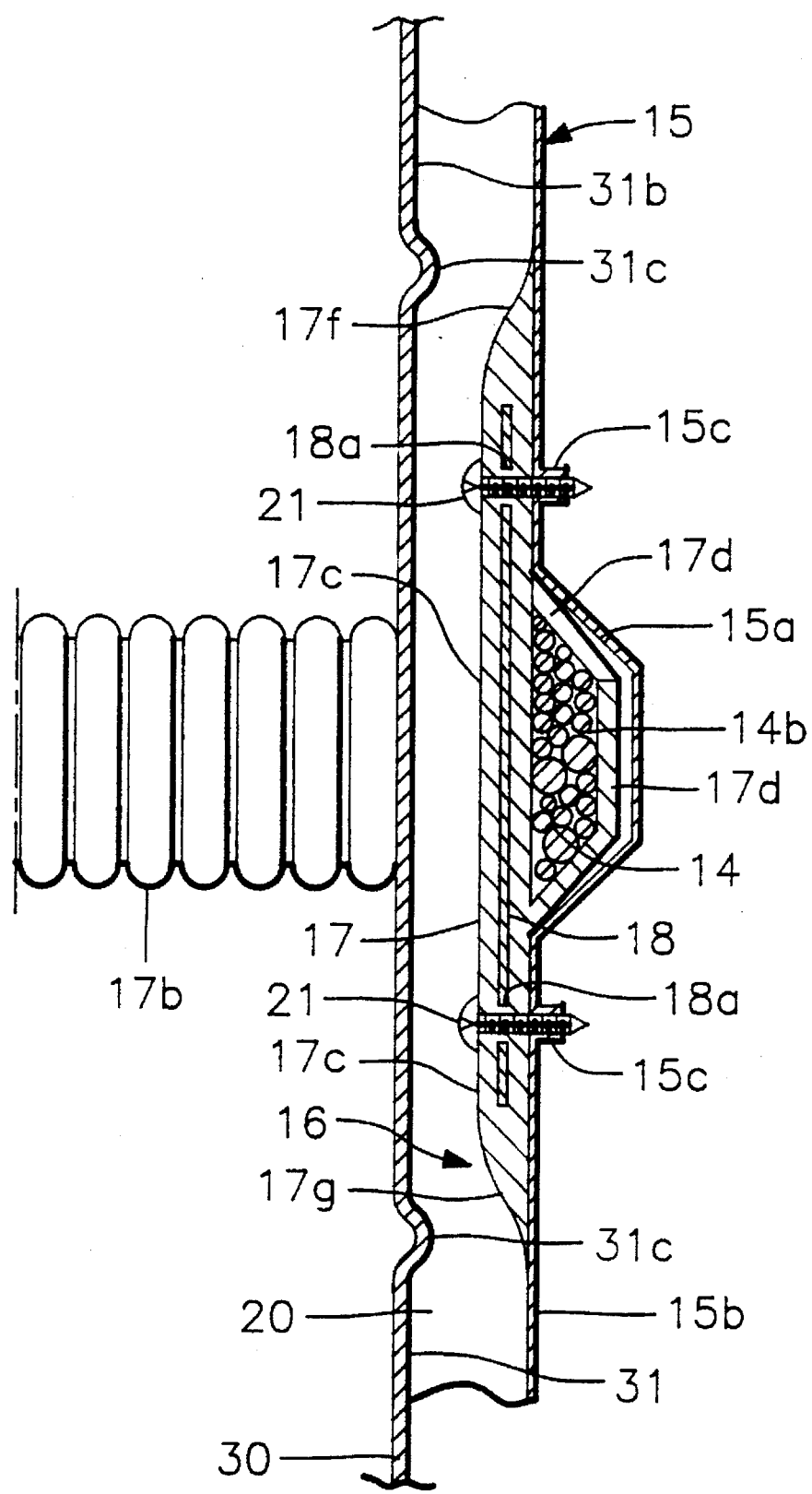
FIG. 14 is a sectional view taken on line B—B of FIG. 1 when the vehicle door is closed, showing the third embodiment.

The mounting plate 18 is made of synthetic resin or metal and, as shown in FIGS. 13 and 14, is shaped like a rectangle. The mounting plate 18 is provided with four holes 18a through which screws pass and an opening 18b through which the door harness 14 passes. Further, the mounting plate 18 has a plurality of holes 18c for improving the combination of the mounting plate 18 with the grommet body 17 of which an elastic substance is supplied thereinto when molded.

On the other hand, as shown in FIGS. 11 and 12, four holes 15c into which vises (small screw) passing through the holes 18a are screwed are formed around the hollow 15a in the side face 15 of the inner door panel 13.

A means for pressing and fastening the grommet body 17 to the side face 15 in this embodiment is the via (small screw) 21.

A description will now be given of a method of arranging the harness and other component parts in the vehicle door.

As shown in FIGS. 12 and 13, the cylindrically bundled part 14a of the harness 14 is inserted into the cylindrical portion 17b of the grommet body 17, and a flatwise arrayed part 14b thereof is placed on the back surface of the grommet body 17 and held by the holders 17c. After that, the grommet body 17 is placed to cover the hollow 15a, and then the views 21 are screwed into the holes 15c to fasten the grommet body 17 to the side face 15.

Next, the weather strip 20 is caused to adhere to the waterproof grommet 16 and the side face 15.

Accordingly, continuity is brought about between a C-shaped sealed part P1 (shown by the alternate long and two short dashes line in FIG. 11) made by pressing the grommet body 17 against the side face 15b around the hollow 15a and a sealed part P2 (shown by the alternate long and short dash line) made by pressing the weather strip 20 against the side face 15b. Therefore, water is prevented from coming in the inside of the vehicle.

Since the grommet body 17 is brought into contact with and is fastened to the side face 15b around the hollow 15a, not fastened in the hollow 15a, sealing can be ensured without using the filler 10 and the waterproof sheets 7, 8 shown in FIG. 22. Therefore, the reduction of the number of constituent parts and the number of processes of arranging them can be realized.

Further, since the grommet body 17 is shaped to be swollen up from the side face 15b in the state in which the grommet body 17 is fastened to the side face 15b around the hollow 15a as shown in FIG. 12, the quantity of the wiring harness 14 laid in the hollow 15a can be increased.

The reason is as follows. There is a limit of enlarging the width of the hollow 15a in the vertical direction in relation to a door hinge, etc. In addition, there is a limit of deepening the hollow 15a in relation to drawing. Therefore, instead of making the hollow 15a large, the grommet body 17 is shaped to be swollen up from the side face 15b around the hollow 15a so as not to bring the grommet body 17 into the hollow 15a as far as possible. For this reason, a lager quantity of harness can be contained within the hollow 15a limited in dimension.

Although the swelling of the grommet body 17 from the side face 15b causes a problem of the sealing of the weather strip 20 mounted on the grommet body 17, the gap between the weather strip 20, the side face 15b, and the grommet body 17 can be certainly sealed because a gentle slope runs up from the side face 15 to the grommet body 17.

Further, the holders 17d for holding the harness 14 facilitate the disposing process because the harness 14 can be easily inserted into the hollow 15a without becoming untidy on the back side of the waterproof grommet 16 when the waterproof grommet 16 is disposed.

Further, without forming a concavity in the pillar outer 31 for receiving a swelling of the weather strip 20 caused by the swelling of the grommet body 17 as shown in FIG. 12, the sealing can be ensured between the weather strip 20 and the periphery of the door opening of the vehicle body. The reason is that the grommet body 17 is thinner than the weather strip 20, and the amount of elastic deformation of the weather strip 20 is large and therefore, as shown in FIG. 14, the swelling of the weather strip 20 shown in FIG. 12 can be absorbed by the elastic deformation thereof when the door is closed.

In the embodiment shown in FIG. 14, the protrusions 31c formed on the pillar 30, which respectively face the upper and lower edge parts 17f and 17g of the waterproof grommet 16 with the weather strip 20 between, cut into and press the weather strip 20 against the slanted parts 17f and 17g. Accordingly, the sealing of them can be ensured yet more.

Figure 15:
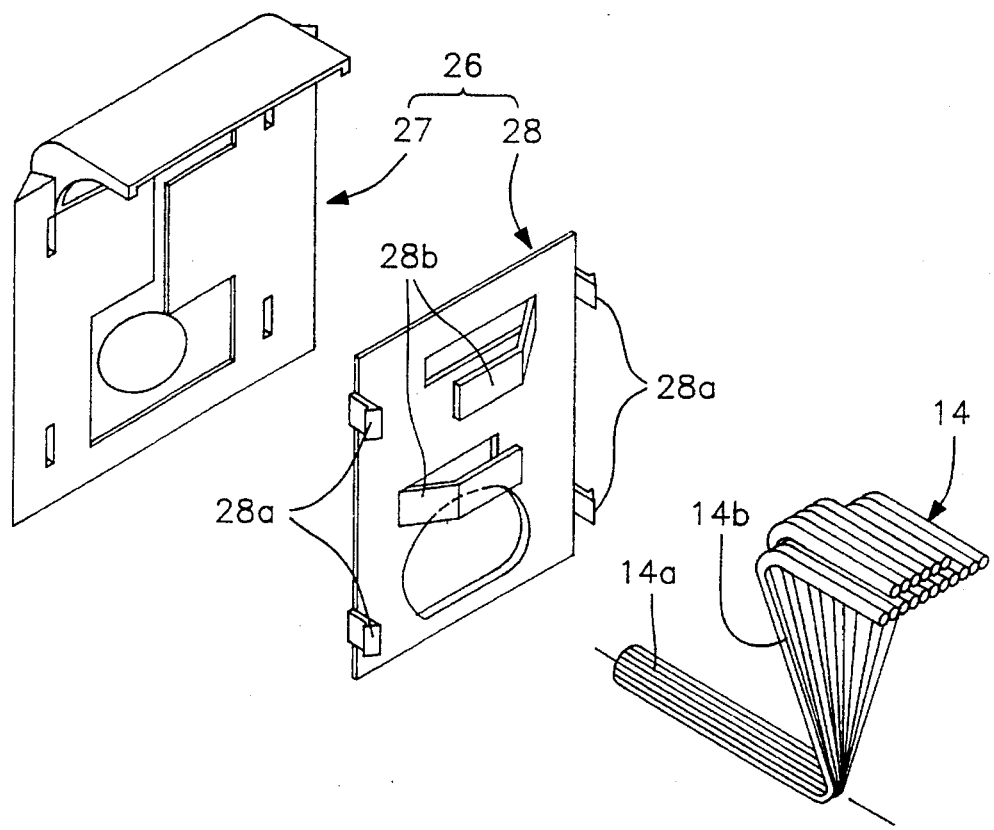
FIG. 15 is an exploded perspective view of a grommet main plate, a mounting plate, and a door harness, showing a fourth embodiment of the present invention.

FIG. 15 shows a fourth embodiment of the present invention.

In a waterproof grommet 26 in this embodiment, a mounting plate 28 inserted in a grommet body 27 by the insertion-molding method is provided with four claw-like hooks 28a instead of the vises used in the first embodiment and a pair of holders 28b instead of the lid 17d used in the first embodiment.

When the waterproof grommet 26 is mounted on the door panel, the door harness 14 is held by the holders 28b. The harness 14 can be more certainly held by the holders 28b formed on the rigid mounting plate 28 than by holders formed on the elastic grommet body 27.

Further, when the waterproof grommet 26 is mounted on the door panel, the hooks 28a are, as shown in FIG. 3, inserted and fastened in the holes 15a of the inner door panel 13. In this state, the elastic grommet body 27 is pressed against the side face 15 so as to ensure the sealing. Therefore, the waterproof grommet 26 can be set thereon by one operation, in other words, only by inserting and fastening the hooks 28a in the holes 15a.

Since the other arrangements and actions are the same as those in the first embodiment, a description of them is omitted.

Figure 16:
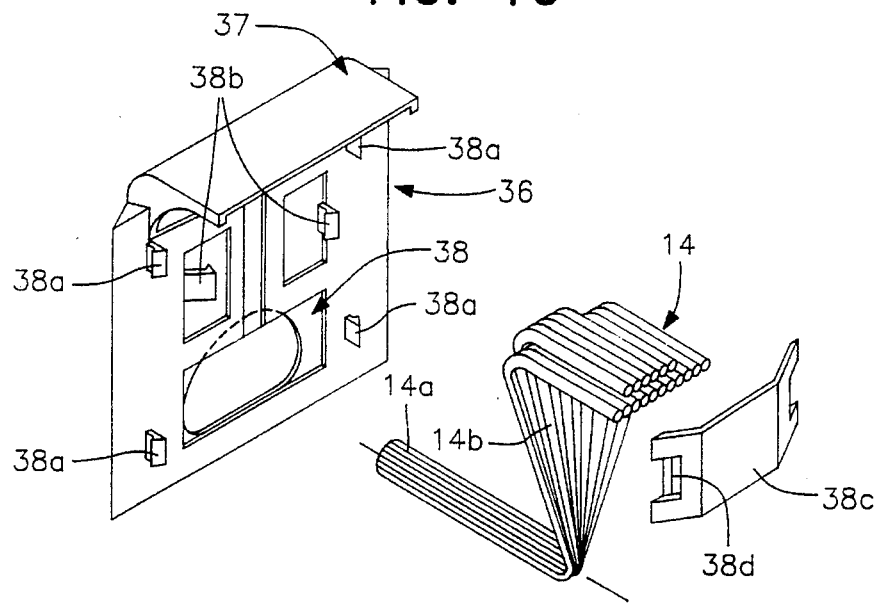
FIG. 16 is an exploded perspective view of a waterproof grommet and a door harness, showing a fifth embodiment of the present invention.

FIG. 16 shows a fifth embodiment of the present invention.

A mounting plate 38 of a waterproof grommet 36 in this embodiment is different from the mounting plate 28 having the holders 28b in the fourth embodiment. The mounting plate 38 is constructed as follows.

The mounting plate 38 is provided with a pair of hooks 38b with which claws 38d formed at both the ends of a supporting member 38c are engaged for fastening the supporting member 38c to the mounting plate 38.

In order to hold the harness 14, the harness 14 is first placed between the hooks 38b and then the supporting member 38c is mounted on the harness 14 so as to engage the hooks 38b with the claws 38d. Accordingly, since there is no space from which the harness 14 slips down, the harness 14 can be more certainly held.

In this embodiment, a holding member is constituted of the hooks 38d and the supporting member 38c.

Since the other arrangements and actions are the same as those in the fourth embodiment, a description of them is omitted.

FIGS. 17 to 20 show a sixth embodiment of the present invention.

Figure 18:
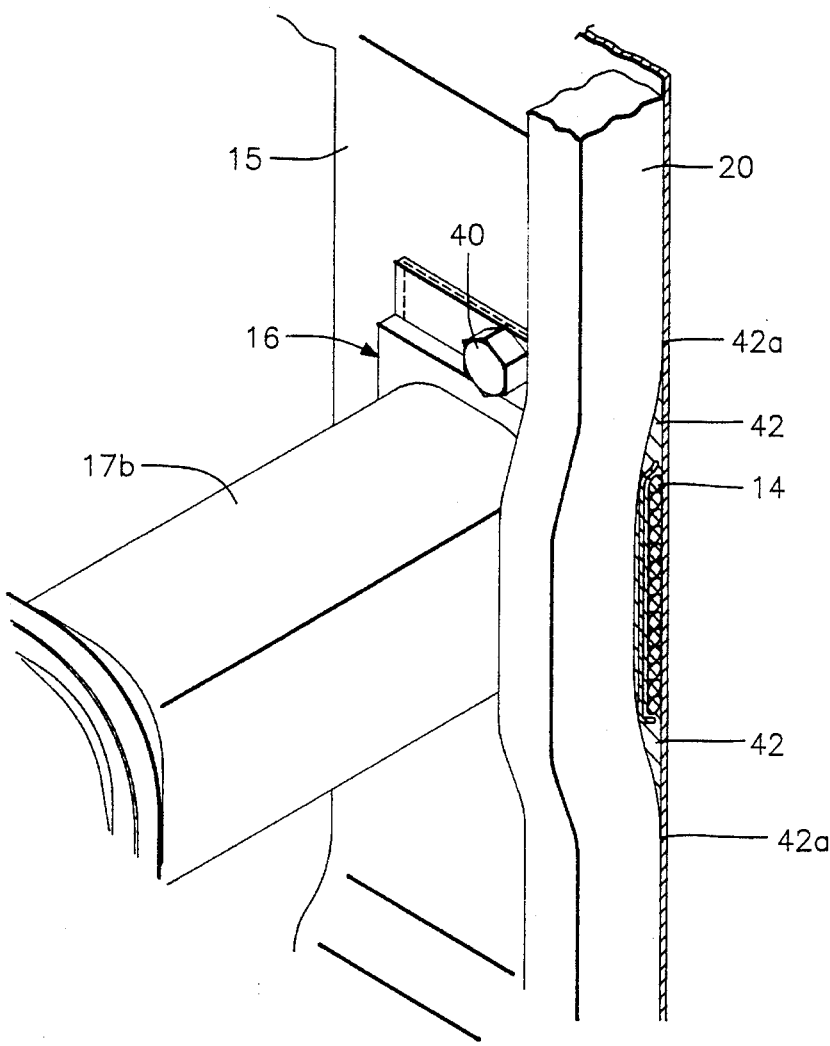
FIG. 18 is an enlarged partial perspective view which corresponds to FIG. 1, showing the sixth embodiment.
Figure 19:
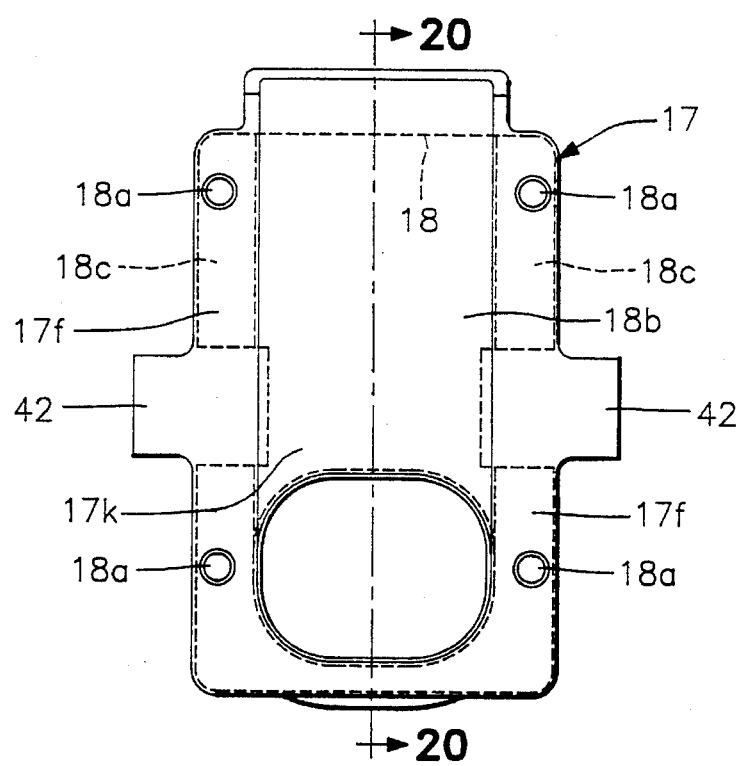
FIG. 19 is a rear elevation of the waterproof grommet, showing the sixth embodiment.
Figure 20:
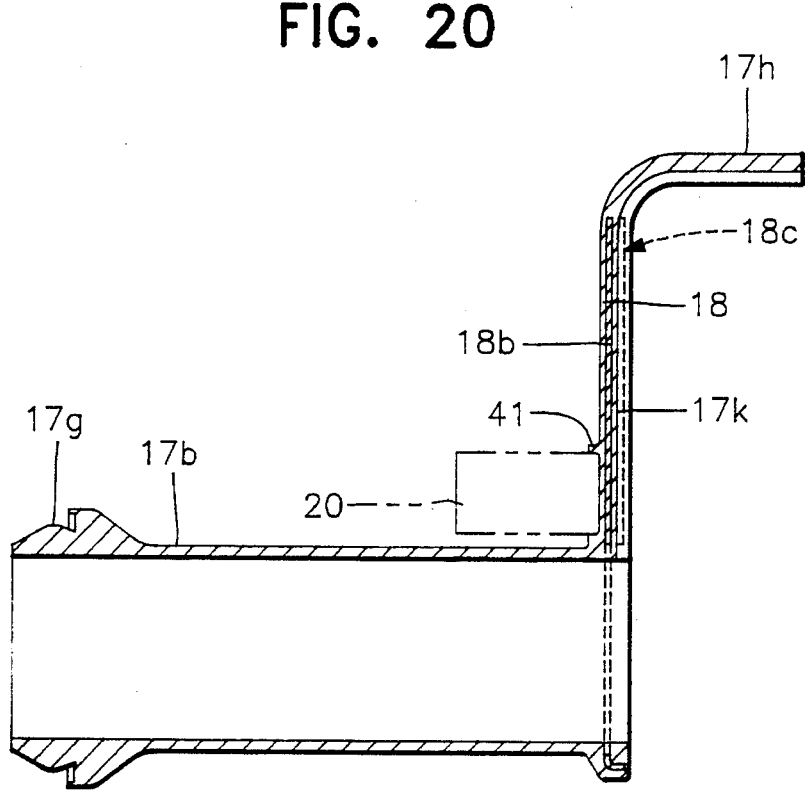
FIG. 20 is a sectional view taken on line A—A of FIG. 19, showing the sixth embodiment.
Figure 21:
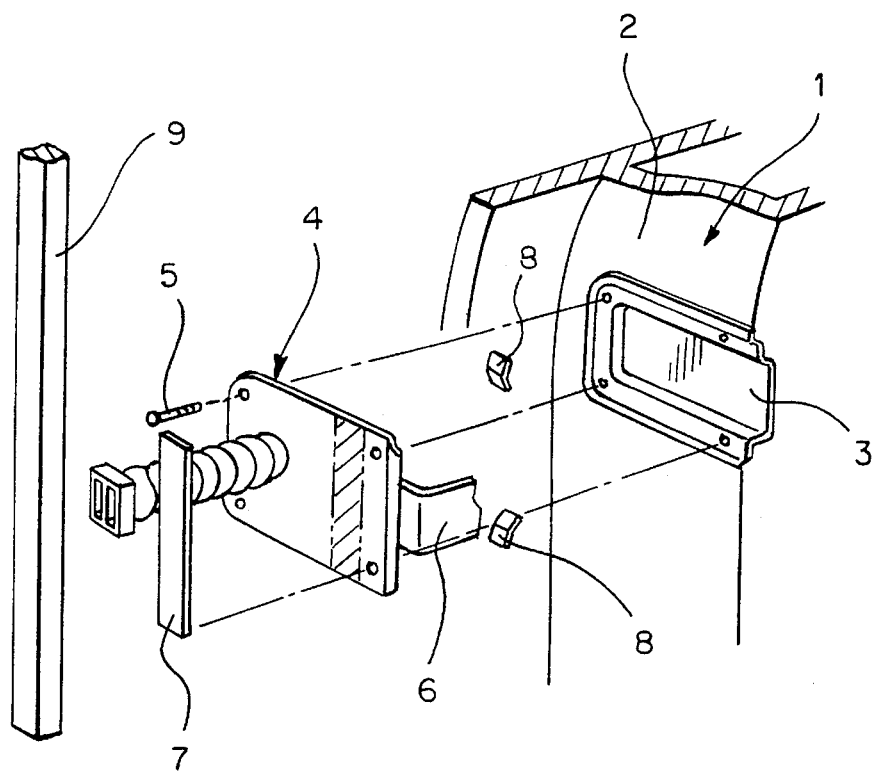
FIG. 21 is an exploded perspective view of a conventional construction of a vehicle door provided with a door harness.

In this embodiment, the mounting plate 18 is made of synthetic resin or metal and is rectangular and planar as shown in FIGS. 19 and 20. A peripheral part 18c of the mounting plate 18 slightly projects toward the inner door panel side 13 from a central part 18b thereof. Four holes 18a into which screws or the like are driven are formed in the peripheral part 18c. A grommet body 17 of a waterproof grommet 16 has a concave part 17k on the back side of the grommet body 17. The depth of the concave part 17k is approximately equal to the thickness of the flattened harness 14 which is laid in the concave part 17k as shown in FIG. 18.

The peripheral part 18c of the mounting plate 18, or the peripheral part 17f of the grommet body 17 is tightly fastened to the side face 15 of the inner door panel 13 by means of bolts 40. Accordingly, the harness 14 is water-tightly enclosed between the grommet body 17 and the side face 15, and the protrusion of the grommet body 17 from the side face 15 can be lessened. The use of a metallic mounting plate instead of the resinous mounting plate 18 enables the protrusion of the grommet body 17 to be lossened even more. A fastening means in the sixth embodiment is the bolt 40.

Figure 17:
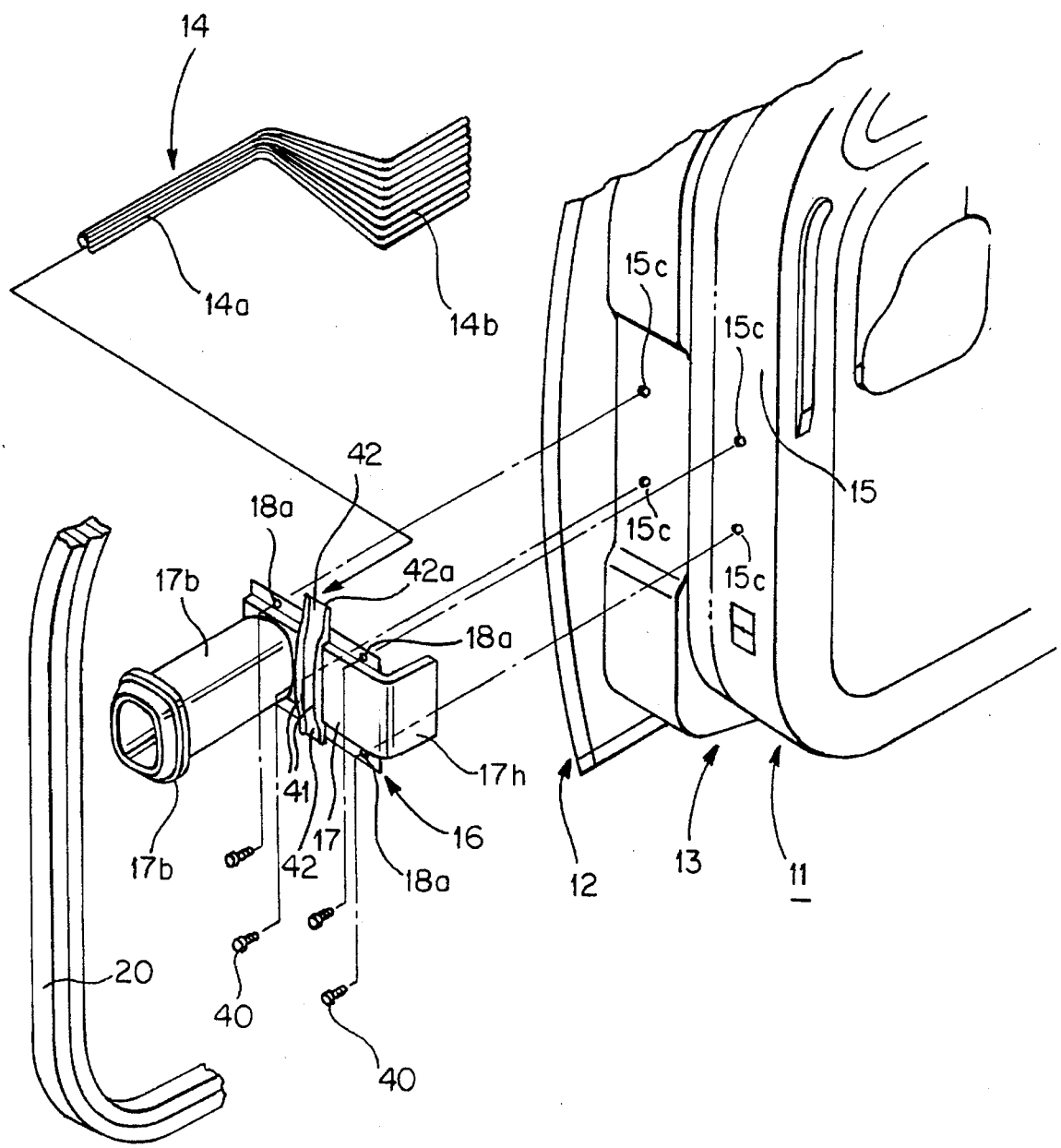
FIG. 17 is an exploded perspective view which corresponds to FIG. 4, showing a sixth embodiment of the present invention.

As shown in FIGS. 17 and 18, extension pieces 42 to which the weather strip 20 adheres are integrated with the surface 17c of the grommet body 17. The pieces 42 each extend from the peripheral part 17f of the grommet body 17 in a direction in which the weather strip 20 is elongated. The width of the piece 42 is slightly larger than that of the weather strip 20, and the thickness of the piece 42 gradually becomes smaller from the middle of the grommet body 17 toward the end 42a of the piece 42. The end 42a is made extremely thin, as shown in FIG. 18, so that small openings are not left between the weather strip 20 and the side face 15 of the inner door panel 13 when the surface 31b of the pillar outer 31 enclosing the door opening (entrance) presses the weather strip 20 against the piece 42 and the side face 15. Therefore, since no difference in level is brought about between the piece 42 and the side face 15, the weather strip 20 can effectively perform the function of sealing.

Further, as shown in FIGS. 17 and 20, a pair of fences 41 for positioning the weather strip 20 are formed on the surface 17c of the grommet body 17 to which the weather strip 20 is caused to adhere and on the piece 42. The fences 41 are erected and elongated along both sides of the weather strip 20. The positioning of the weather strip 20 can be carried out by the fences 41 when it is disposed on the door and is in use.

Further, since the cylindrical portion 17b of the grommet body 17 has a constant diameter and a smooth surface, the shape of a mold for it is simple and accordingly the mold can be economically manufactured.

As mentioned above, according to the present invention, the following effects are obtained.

Sealing can be ensured without additionally using a conventional sealing member, such as a waterproof sheet, because an elastic and flexible grommet body is pressed on a side face of a door panel by means of a mounting plate. Accordingly, the number of component parts and the number of processes of arranging them can be reduced.

The formation of projections on the mounting plate and the formation of holes for receiving the projections facilitate the fastening of a waterproof grommet united with the mounting plate to the side face of the door panel.

The flattening of the side face of the door panel facilitates the manufacturing of the door panel because there is no need to form a concave groove in the side face as in the prior art.

A protrusion of a weather proof caused by lapping over the waterproof grommet is received by a concavity formed in a surface of a pillar outer enclosing a door opening (entrance) when the door is closed. Accordingly, regardless of the same sectional shape of the overall weather strip, the quantity of elastic deformation of the weather strip is the same both in a part of the weather strip overlapping with the grommet body and in the other parts thereof. As a result, the gap between the door and the surface of the pillar outer is uniformly sealed by the weather strip.

Sealing is ensured by forming projections on the surface of the pillar outer. The projections of the pillar outer respectively face the upper and lower edges of the water-proof grommet with the weather strip between. Accordingly, when the door is closed, the projections press the weather strip against the door panel so as to close small openings left between the grommet body, the weather strip, and the side face of the door panel.

A mold for molding the waterproof grommet can be made simple in shape and be economically manufactured because a cylindrical portion of the grommet body has a constant diameter and a smooth surface.

In the prior art, a case occurs in which small openings are left between the grommet body and the side face of the door panel because the grommet body is placed within a concavity formed in the side face of the door panel. In contrast, in the present invention the grommet body is brought into contact with the side face surrounding the concavity. Accordingly, sealing is ensured without additionally using any other sealing members as in the prior art, and therefore the number of constituent parts and the number of processes of arranging them can be reduced.

The wiring harness laid in the concavity formed in the side face is larger in quantity than that in the prior art because the grommet body is shaped to be swollen up from the side face in a state in which the grommet body is fastened to the side face surrounding the concavity.

Holders for holding the harness are formed on the grommet body or on the back side of the mounting plate. Thereby, the harness can be easily placed in the concavity without being separated and dropped out of the concavity when the waterproof grommet is mounted on the door panel.

Extension pieces the thickness of which is gradually lessened in the longitudinal direction are integrated with the grommet body. Thereby, a difference in level between the grommet body and the side face of the door panel is removed, and therefore the sealing of the water strip is improved.

A pair of fences parallel with each other are integrally formed on a surface of the grommet body so that the weather strip extends along the fences. The fences can position the weather strip when the weather strip is mounted on the door panel and is in use.

What is claimed is:

1. In a construction of a vehicle door provided with a wiring harness, comprising a door trim mounted on an interior surface of a door panel of a door with which an entry of a vehicle is closed; and a wiring harness inserted between said door trim and the interior surface of said door panel, bent along a side face of said door panel to which a door hinge is attached, and extended to a part of a vehicle body enclosing the door from the side face; said construction further comprising:

a waterproof grommet through which said harness passes, mounted on the side face;

said waterproof grommet being made of an elastic substance and having a grommet body and a fastening means for fastening said grommet body to the side face by pressing an edge of a mounting plate included in said grommet body against the side face, so that said harness is watertightly laid between said grommet body and the side face by said fastening means.

2. A construction of a vehicle door provided with a wiring harness according to claim 1, wherein said mounting plate is inserted in said grommet body by an insertion-molding method.

3. A construction of a vehicle door provided with a wiring harness according to claim 1, wherein said mounting plate is fitted in a space formed in said grommet body.

4. A construction of a vehicle door provided with a wiring harness according to claim 1, wherein said mounting plate is larger is rigidity than said grommet body.

5. A construction of a vehicle door provided with a wiring harness according to claim 1, wherein said fastening means consists of a piece formed on said mounting plate and a hole formed in the side face of said door panel, said piece being inserted into and engaged with said hole.

6. A construction of a vehicle door provided with a wiring harness according to claim 1, wherein said fastening means is a set of screws.

7. A construction of a vehicle door provided with a wiring harness according to claim 1, wherein the side face of said door panel to which the door hinge is attached is flattened.

8. A construction of a vehicle door provided with a wiring harness according to claim 1, further comprising a concavity formed in a surface of a part of a vehicle body enclosing the door so as to receive a protrusion of a weather strip caused by lapping over said waterproof grommet when the door is closed.

9. A construction of a vehicle door provided with a wiring harness according to claim 1, further comprising a pair of projections formed on a surface of a part of a vehicle body enclosing the door, said projections respectively facing the upper and lower edges of said waterproof grommet with a weather strip between, said projections pressing said weather strip lapping over said grommet body against the side face when the door is closed.

10. A construction of a vehicle door provided with a wiring harness according to claim 1, the upper and lower edges of said grommet body each slope gently to the side face of said door panel.

11. A waterproof grommet through which a wiring harness passes, mounted on a side face of a door panel to which a door hinge is attached, and used in a construction of a vehicle door provided with the wiring harness in which a door trim is mounted on an interior surface of said door panel of a vehicle door with which an entry of a vehicle is closed and the wiring harness is inserted between said door trim and an interior surface of said door panel and is bent along a side face of said door panel to which the door hinge is attached and then is extended to a part of a vehicle body enclosing the door from the side face, said waterproof grommet being characterized in that:

said waterproof grommet is made of an elastic substance and has a grommet body which includes a mounting plate, said grommet body having a fastening means for pressing a peripheral part of said mounting plate against the side face of said door panel and fastening said grommet body to the side face so as to watertightly place said hardness between said grommet body and the side face, said grommet body further having a cylindrical portion erected at an edge part of a front of said grommet body and a covering portion integrated with the front of said grommet body at the other edge part thereof, said covering portion being extended in a direction opposite to said cylindrical portion, said harness being laid in the form of a flattened array under said covering portion and being gradually made round and then being caused to pass through said cylindrical portion in the form of a cylindrical bundle.

12. A waterproof grommet according to claim 11, wherein said cylindrical portion of said grommet body has a constant diameter and a smooth surface.

13. In a construction of a vehicle door provided with a wiring harness, comprising a door trim mounted on an interior surface of a door panel of a door with which an entry of a vehicle is closed; and a wiring harness inserted between said door trim and the interior surface of said door panel, bent along a side face of said door panel to which a door hinge is attached, and extended to a part of a vehicle body enclosing the door from the side face; said construction further comprising:

a concavity formed in the side face to which the door hinge is attached, said harness being laid in said concavity;

a waterproof grommet through which said harness passes, mounted on the side face so as to cover said concavity; and a weather strip lapping over said waterproof grommet;

wherein said waterproof grommet is made of an elastic substance and has a grommet body which includes a mounting plate, said grommet body being sized so as to cover said concavity and be pressed against the side face surrounding said concavity, said grommet body having a fastening means for pressing a peripheral part of said mounting plate against the side face of said door panel and fastening said grommet body to the side face, said grommet body being shaped to be swollen when said grommet body is fastened to the side face and to be gently sloped from upper and lower edges of said grommet body over which said weather strip laps toward the side face.

14. A construction of a vehicle door provided with a wiring harness according to claim 13, wherein said mounting plate is inserted in said grommet body by an insertion-molding method.

15. A construction of a vehicle door provided with a wiring harness according to claim 13, wherein said mounting plate is fitted in a space formed in said grommet body.

16. A construction of a vehicle door provided with a wiring harness according to claim 13, wherein said mounting plate is larger is rigidity than said grommet body.

17. A construction of a vehicle door provided with a wiring harness according to claim 13, wherein said fastening means is a set of screws for fastening said grommet body to the side face of said door panel.

18. A construction of a vehicle door provided with a wiring harness according to claim 13, wherein said fastening means consists of a piece formed on said mounting plate and a hole formed in the side face of said door panel, said piece being inserted into and engaged with said hole.

19. A construction of a vehicle door provided with a wiring harness according to claim 13, further comprising a pair of projections formed on a surface of a part of a vehicle body enclosing the door, said projections respectively facing the upper and lower edges of said waterproof grommet with a weather strip between, said projections pressing said weather strip which laps over said grommet body against the side face when the door is closed.

20. A construction of a vehicle door provided with a wiring harness according to claim 13, further comprising a holding member, formed on a back side of said grommet body, for holding said harness, said holding member being contained within said concavity when the door is closed.

21. A construction of a vehicle door provided with a wiring harness according to claim 13, further comprising a holding member, formed on said mounting plate, for holding said harness, said holding member being contained within said concavity when the door is closed.

22. A construction of a vehicle door provided with a wiring harness according to claim 1, further comprising extension pieces integrally formed on the upper and lower edges of a surface of said grommet body, respectively, said extension pieces being extended along said weather strip mounted thereon and having a width slightly larger than said weather strip, said extension pieces gradually becoming thinner in an extended direction of said extension pieces.

23. A construction of a vehicle door provided with a wiring harness according to claim 1, further comprising a pair of fences parallel to each other integrally formed on the surface of said grommet body, said fences being erected along both sides of said weather strip.

* * * * *